United States Patent [19]

Tanaka et al.

[11] Patent Number: 4,994,647
[45] Date of Patent: Feb. 19, 1991

[54] COVERED ELECTRODE FOR USE IN ARC WELDING OF CR-MO TYPE LOW ALLOY STEELS

[75] Inventors: Osamu Tanaka, Fujisawa; Shogo Natsume, Chigasaki; Akinobu Goto, Fujisawa, all of Japan

[73] Assignee: Kabushiki Kaisha Kobe Seiko Sho, Kobe, Japan

[21] Appl. No.: 480,974

[22] Filed: Feb. 16, 1990

[30] Foreign Application Priority Data

Feb. 21, 1989 [JP] Japan .................................. 1-41173

[51] Int. Cl.⁵ ............................................. B23K 35/22
[52] U.S. Cl. ........................... 219/146.23; 219/145.23
[58] Field of Search ........... 219/146.1, 146.23, 145.23; 428/606, 607, 682, 683, 684, 685; 420/105, 106, 108, 109, 110, 111

[56] References Cited

U.S. PATENT DOCUMENTS

| | | | |
|---|---|---|---|
| 3,162,751 | 12/1964 | Robbins | 219/146.23 |
| 3,394,238 | 7/1968 | Wilcox | 219/146.23 |
| 3,404,249 | 10/1968 | Dorschu | 219/146.23 |
| 3,787,658 | 1/1974 | Kammer | 219/146.23 |

FOREIGN PATENT DOCUMENTS

| | | | |
|---|---|---|---|
| 3339665 | 5/1984 | Fed. Rep. of Germany | 219/146.1 |
| 53-73444 | 6/1978 | Japan | 219/146.1 |
| 57-85692 | 5/1982 | Japan | 219/146.1 |
| 57-159293 | 10/1982 | Japan | 219/146.23 |
| 57-193298 | 11/1982 | Japan | 219/146.23 |
| 58-391 | 1/1983 | Japan | 219/146.1 |
| 58-6790 | 1/1983 | Japan | 219/146.1 |
| 58-16792 | 1/1983 | Japan | 219/146.1 |
| 58-58982 | 4/1983 | Japan | 219/146.1 |
| 59-47071 | 3/1984 | Japan | 219/146.23 |
| 59-169695 | 9/1984 | Japan | 219/146.1 |
| 59-193789 | 11/1984 | Japan | 219/146.23 |
| 59-193790 | 11/1984 | Japan | 219/146.23 |
| 59-197394 | 11/1984 | Japan | 219/146.1 |
| 60-231591 | 11/1985 | Japan | 219/146.23 |
| 60-261690 | 12/1985 | Japan | 219/146.1 |
| 61-33790 | 2/1986 | Japan | 219/146.1 |
| 61-67593 | 4/1986 | Japan | 219/146.23 |
| 61-135499 | 6/1986 | Japan | 219/146.23 |
| 61-222687 | 10/1986 | Japan | 219/146.23 |
| 61-232089 | 10/1986 | Japan | 219/146.1 |
| 63-2592 | 1/1988 | Japan | 219/146.1 |
| 63-112094 | 5/1988 | Japan | 219/146.1 |

OTHER PUBLICATIONS

Japanese Abstract J62161496.
Japanese Abstract J62137196.

*Primary Examiner*—John J. Zimmerman
*Attorney, Agent, or Firm*—Oblon, Spivak, McClelland, Maier & Neustadt

[57] ABSTRACT

Described herein is a covered electrode for use in arc welding of Cr-Mo type low alloy steel, the covered electrode having a composition determined in consideration of the yield of each additive element as well as the relationship between the contents of certain key component elements, and permitting to form a weld metal with excellent high temperature strength and toughness along with appropriate room temperature strength.

4 Claims, 1 Drawing Sheet

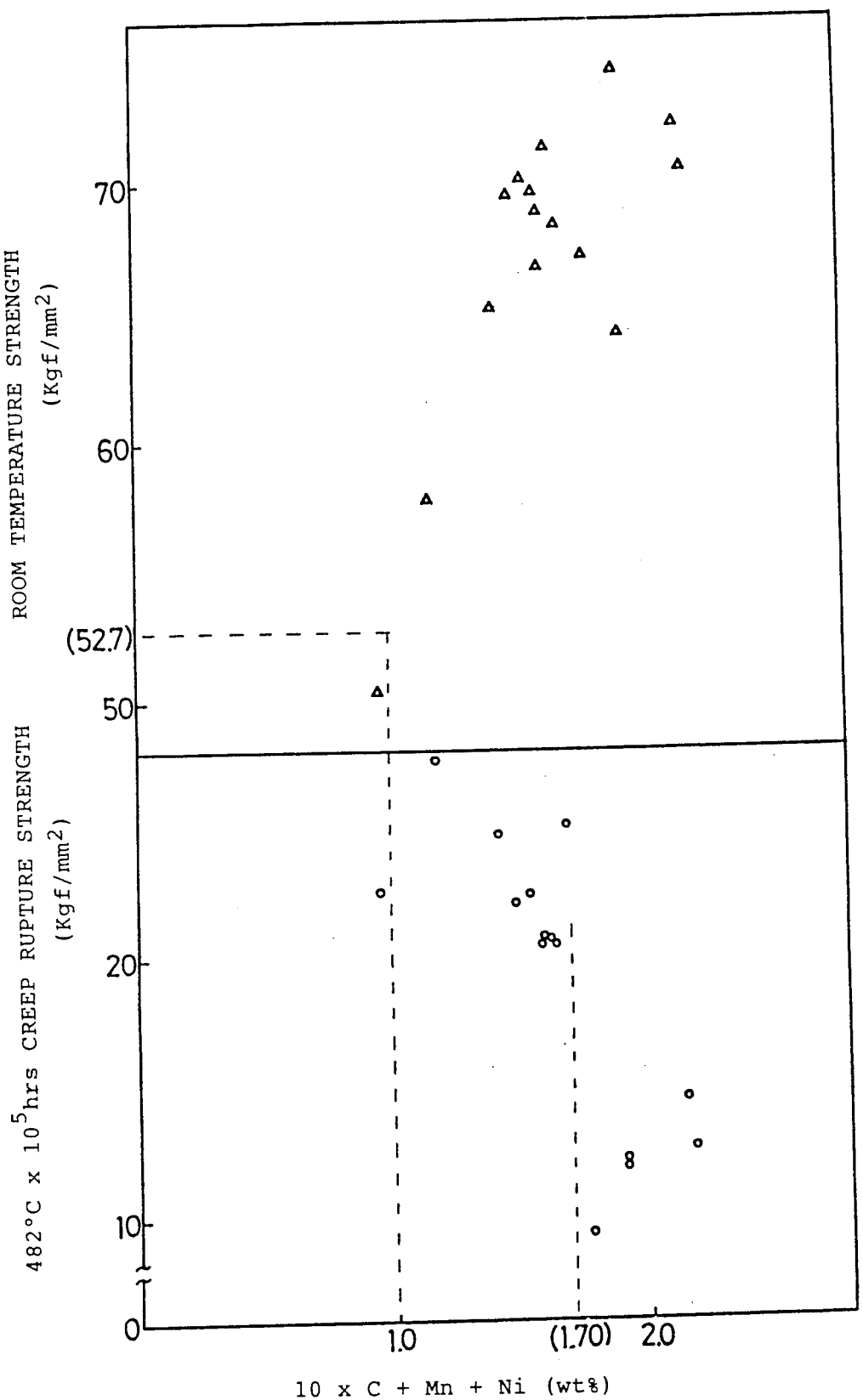

ically suitable for use in arc welding of 2.25-3% Cr-1% Mo high strength steels to form a weld metal with excellent properties in high temperature strength and toughness.

COVERED ELECTRODE FOR USE IN ARC WELDING OF CR-MO TYPE LOW ALLOY STEELS

BACKGROUND OF THE INVENTION

1. Field of the Invention

This invention relates to a covered electrode which is particularly suitable for use in arc welding of 2.25-3% Cr-1% Mo high strength steels to form a weld metal with excellent properties in high temperature strength and toughness.

2. Prior Art

Because of the excellent high temperature properties, 2.25-3% Cr-1% Mo steel has been applied as a material for boilers, pressure vessels, and chemical reactors.

Such 2.25-3% Cr-1% Mo steels, however, are unsatisfactory for application to pressure vessels which are used under higher temperature and pressure conditions, for example, as in a coal liquefaction plant. In an attempt to meet the requirements in this regard, there have been developed 2.25-3% Cr-1% Mo high strength steels which are imparted with higher strength by addition of V and Nb and at the same time improved in properties against hydrogen attacks.

On the other hand, there have been proposed a number of welding materials for the steels of the sort mentioned above. For example, Japanese Laid-Open Patent Applications 62-137196 and 62-161496 propose a covered electrode for use in arc welding of Cr-Mo type low alloy steels.

The improvement of the high temperature properties like creep rupture strength of the welding material simply by addition of V and Nb, however, invites an excessive increase in room temperature strength, giving rise to a problem of increased sensitivity to hydrogen embrittlement.

SUMMARY OF THE INVENTION

The present invention contemplates to eliminate the above-mentioned problems of the prior art, and has as its object the provision of a covered electrode which is particularly suitable for welding 2.25-3% Cr-1% Mo high strength low alloy steel and capable of forming a weld metal with satisfactory high temperature properties including creep rupture strength without entailing an excessive increase in the room temperature strength.

For achieving the above-mentioned object, the present inventors have conducted an extensive study particularly with regard to the covered electrode which can enhance the high temperature strength without excessively increasing the room temperature strength.

As a result, it has been found that the afore-mentioned object can be achieved by restricting the contents of the respective additive elements not only on the basis of the electrode as a whole but also in relation especially with the amount of C, Mn and Ni contents, considering their yields in the deposit metal when supplied as constituent elements of the core wire and flux.

Namely, in accordance with the present invention, there is provided a covered electrode for use in arc welding of Cr-Mo type low alloy steel, which is controlled to contain, through adjustment of the contents of additive elements in the core wire and/or the flux thereof, $C \leq 0.12\%$, $Mn \leq 1.0\%$, $Si \leq 0.4\%$, $Cr = 1.9-3.5\%$, $Mo = 0.85-1.5\%$, $Ni \leq 0.2\%$, $N \leq 0.017\%$, $V = 0.16-0.4\%$ and $Nb = 0.002-0.045\%$, and optionally $B = 0.0005-0.0060\%$ in a range according to Equation (1) below, and to have the value of P in Equation (2) below in the range of 1.00-1.70.

$$M = \{Bw \times [M(\%)]w\} + \{Af/1 - Af \times Bf \times [M(\%)]f\} \quad (1)$$

wherein
M: Content (%) of the element such as Cr, Mo or the like,
Bw: Coefficient of yield in the deposit metal of the element supplied from the core wire,
Bf: Coefficient of yield in the deposit metal of the element supplied from the flux,
[M(%)]w: Content (%) of the core wire constituent element in the total mass of the core wire,
[M(%)]f: Content (%) of the flux constituent element in the total mass of the flux, and
Af: Weight ratio (%) of the coated flux to the total mass of the electrode.

$$P = 10 \times C + Mn + Ni \ (\%). \quad (2)$$

The above and other objects, features and advantages of the invention will become apparent from the following description and the appended claims, taken in conjunction with the accompanying drawing.

BRIEF DESCRIPTION OF THE DRAWING

In the accompanying drawing:
The sole FIGURE is a diagram showing the amount of $(10 \times C + Mn + Ni)$ in relation with the creep rupture strength and room temperature tensile strength.

PARTICULAR DESCRIPTION OF THE INVENTION

Hereafter, the invention is described in greater detail.

Firstly, for determining the amount of each additive element to be contained in the core wire and/or the flux, the coefficient of yield in the deposit metal is considered according to Equation (1) given above. In this Equation, M is the content (%) of a contained element such as Cr, Mo or the like, while $[M(\%)]w$ and $[M(\%)]f$ are determined by the rates of addition to the core wire and flux, respectively. Af is the percentage by weight of the flux in the total weight of the electrode, and, although it is determined by the coating rate, is preferably selected from the range of 0.23-0.32 in case of a covered electrode conforming with the object of the invention.

With regard to Bw and Bf, namely, the coefficients of yield in the deposit metal of an element supplied from the core wire and flux, their values vary from element to element, for example, depending upon the degree of affinity with oxygen, and even the values of the same element are influenced by the composition of the flux (e.g., by the contents of the generally included components such as slag-forming agent, arc stabilizer and gas generating agent). Practical ranges of the respective additive elements are shown in Table 1.

In view of these conditions, the above-stated numeric restrictions on the contents of the respective additive elements of the core wire and/or the flux are based on the following reasons.

[C: $\leq 0.12\%$]

C is an important element for enhancing the hardenability as well as the room and high temperature strengths of the weld metal. However, a C content in excess of 0.12% tends to accelerate coarse carbide precipitations when heated to a high temperature, lowering the creep rupture strength. Therefore, the C content should not be larger than 0.12%.

[Mn: ≦1.0%]

Mn is an indispensable element for enhancing the hardenability of the weld metal and for securing its strength. However, an Mn content greater than 1.0% will invite excessive quench hardening and degradations in crack resistance, leading to lowered creep strength.

[Si: ≦0.4%]

Si is an essential element for deoxidation of the weld metal, but the toughness is lowered by thermal aging over a long time period when its content is greater than 0.4%. Accordingly, the Si content should be restricted to 0.4% or less.

[Cr: 1.9-3.5%]

Cr is an essential element for securing anti-oxidation and anti-corrosion resistances and high temperature strength of the weld metal, and is added in the range of 1.9-3.5% depending upon the nature of the steel to be welded.

[Mo: 0.85-1.5%]

Similarly to Cr, Mo is an element which is effective for enhancing the high temperature strength and, for this purpose, needs to be added at least in an amount of 0.85% or more. However, addition of Mo in excess of 1.5% will result in undesirable degradations in quality of the weld. Accordingly, the Mo content should be in the range of 0.85-1.5%.

[Ni: ≦0.2%]

Ni is an effective element for stabilizing the toughness but should be restricted to 0.2% or less since the properties in high temperature strength, particularly, the creep rupture strength will be lowered if its content exceeds 0.2%.

[V: 0.16-0.40%]

V is an element which is extremely effective for the improvement of resistance to hydrogen attacks as well as for securing satisfactory creep rupture strength. Especially, for the improvement of the resistance to hydrogen attacks, it should be added at least in an amount of 0.16 or more. However, since a V content in excess of 0.40% is reflected by a degradation in toughness, it should be added in the range of 0.16-0.40%.

[Nb: 0.002-0.045%]

Similarly to V, Nb is effective for enhancing the creep rupture strength and, in order to secure the expected effects, needs to be added at least in an amount of 0.002% or more. Since the toughness abruptly drops with an Nb content in excess of 0.045%, Nb should be added in the range of 0.002-0.045%.

[N: ≦0.017%]

N is harmful from the standpoint of obtaining weld metal with good toughness, and therefore its content should be suppressed to not more than 0.017%.

In addition to the foregoing essential additive elements, a suitable amount of B may be optionally added if desired.

[B: 0.0005-0.0060%]

B acts to enhance the quench hardenability and make the structure finer, besides enhancement of toughness. These effects are insufficient when its content is smaller than 0.0005% and the weld metal becomes too hard when in excess of 0.0060%. Accordingly, the B content should be in the range of 0.0005-0.0060%.

TABLE 1

| Element | Bw | Bf |
| --- | --- | --- |
| C | 0.5~1.0 | 0.3~1.0 |
| Mn | 0.2~0.8 | 0.3~0.8 |
| Si | 0.05~0.2 | 0.1~0.4 |
| Cr | 0.5~1.0 | 0.5~1.0 |
| Mo | 0.5~1.0 | 0.4~1.0 |
| N | 1.0~1.7 | 0.3~0.9 |
| Ni | 0.8~1.0 | 0.7~1.0 |
| Nb | 0.2~1.0 | 0.1~0.7 |
| V | 0.2~1.0 | 0.2~1.0 |
| B | 0.2~0.8 | 0.1~0.8 |

In order to enhance the creep rupture strength, which is an important high temperature strength characteristics, while securing the necessary room temperature strength as shown in FIG. 1, it is a paramount requisite for the electrode not only to contain the selected kinds of essential elements in the optimum amounts as described above, but also to hold the value of P of Equation (2) below in the range of 1.00-1.70.

$$P = 10 \times C + Mn + Ni \ (\%). \tag{2}$$

More specifically, for obtaining high creep rupture strength, it is effective to precipitate and disperse fine carbides of V and Nb in the weld metal. However, it has been found that an excessive C content invites coarsening of the carbide precipitates, and Mn and Ni have effects of accelerating such coarsening. Therefore, in order to attain high creep strength while securing necessary room temperature strength, the combined amount of C, Mn and Ni contents, namely, the value of P should be adjusted to fall in the range of 1.00-1.70 as defined by Equation (2).

That is, the present invention makes it possible to obtain a weld metal with high creep rupture strength while suppressing an excessive increase in room temperature strength, by not only adding V and Nb for the improvement of the creep rupture strength but also holding the contents of V and Nb to minimal necessary amounts through optimizing and balancing the additive amounts of C, Mn and Ni.

The invention is applicable to Cr-Mo type low alloy steels such as 2.25-3% Cr-1% Mo steel with or without addition of V, Nb or the like. Needless to say, there are no particular restrictions on the composition of the steel to which the invention is to be applied.

The present invention is illustrated more particularly by the following examples.

EXAMPLES

After preparing the core wires of the chemical compositions shown in Table 2 and the fluxes of Table 3 containing the additive elements, they were used in different combinations as shown in Table 4 to produce covered electrodes of various adjusted compositions.

Using each of the electrode, welding experiments were conducted on steel plates (ASTM A387 Gr21 Gr22) employed as mother metal conforming with the target composition of the weld metal. The thus formed weld metals had the compositions as shown in Table 4.

The results of the welding experiments are shown in Table 5.

As seen in Table 5, in all of the experiments according to the invention (Experiments 1 to 4), satisfactory characteristics in high temperature strength were obtained without excessively increasing the room temperature strength. However, satisfactory properties at least in room temperature strength, high temperature strength or toughness could not be obtained in the Comparative Examples (Experiment Nos. 5 to 16) where any one of the additive elements was outside the range of the invention or where the respective additive elements were within the ranges according to the invention except for the value of P.

It will be appreciated from the foregoing description that, according to the present invention, the composition of the covered electrode is determined in consideration of the yield of each component element in the deposit metal as well as the relationship between the contents of some key elements, permitting to form a weld metal with excellent high temperature strength and toughness along with appropriate room temperature strength even when applied to high strength 2.25-3% Cr-1% Mo steels.

TABLE 2

| Wire No. | Chemical Composition of Core Wire (wt %) | | | | | |
|---|---|---|---|---|---|---|
| | C | Mn | Si | Cr | Mo | Ni |
| W-1 | 0.08 | 0.53 | 0.02 | 0.02 | 0.01 | 0.02 |
| W-2 | 0.10 | 0.54 | 0.22 | 2.33 | 1.05 | 0.05 |
| W-3 | 0.06 | 1.01 | 0.24 | 3.40 | 1.06 | 0.03 |
| W-4 | 0.07 | 0.52 | 0.02 | 2.94 | 0.98 | 0.04 |

Note: The balance is Fe and inevitable impurities.

TABLE 3

| Flux No. | Alloy Components of Flux (wt %) | | | | | | | | | |
|---|---|---|---|---|---|---|---|---|---|---|
| | C | Mn | Si | Cr | Mo | Ni | N | V | Nb | B |
| F-1 | 0.10 | 1.00 | 4.40 | 5.00 | 2.20 | 0.05 | — | 0.80 | 0.10 | — |
| F-2 | — | 1.00 | 4.40 | 5.80 | 2.20 | 0.15 | — | 0.80 | 0.05 | — |
| F-3 | — | 0.50 | 4.00 | — | — | — | — | 0.40 | 0.15 | 0.01 |
| F-4 | — | 1.00 | 2.00 | 0.50 | — | — | — | 0.60 | 0.15 | — |
| F-5 | 0.30 | 1.00 | 2.00 | 0.50 | — | 0.20 | — | 0.40 | 0.15 | — |
| F-6 | 0.20 | 4.00 | 1.50 | — | — | — | — | 0.60 | 0.05 | — |
| F-7 | — | 1.00 | 4.40 | — | — | 0.30 | — | 0.80 | 0.10 | — |
| F-8 | — | 1.50 | 4.40 | 4.00 | 1.80 | — | — | 0.80 | 0.15 | — |
| F-9 | 0.20 | 0.75 | 1.50 | — | 1.80 | — | — | 0.60 | 0.10 | — |
| F-10 | — | 0.75 | 1.50 | — | — | 0.60 | — | 0.20 | 0.20 | — |
| F-11 | — | 0.50 | 4.00 | 0.50 | — | — | 0.06 | 0.80 | 0.15 | — |
| F-12 | — | 0.75 | 1.50 | — | — | 0.20 | — | 1.60 | 0.05 | — |
| F-13 | 0.30 | 0.50 | 1.50 | — | — | — | — | 0.40 | 0.45 | — |
| F-14 | — | 1.00 | 2.00 | 0.50 | — | — | — | 0.80 | 0.10 | 0.05 |
| F-15 | 0.20 | 0.75 | 4.40 | — | — | — | — | 0.40 | 0.10 | — |

Note: The balance includes arc stabilizer and slag-forming agent in general use.

TABLE 4

| Ex. No. | Wire No. | Flux No. | Chemical Composition of Deposit Metal (wt %) | | | | | | | | | | Category |
|---|---|---|---|---|---|---|---|---|---|---|---|---|---|
| | | | C | Mn | Si | Cr | Mo | Ni | N | V | Nb | B | P | |
| 1 | W-1 | F-1 | 0.10 | 0.62 | 0.35 | 2.34 | 0.98 | 0.05 | 0.015 | 0.27 | 0.02 | — | 1.67 | Invention |
| 2 | W-1 | F-2 | 0.08 | 0.70 | 0.33 | 2.89 | 1.05 | 0.10 | 0.010 | 0.30 | 0.01 | — | 1.60 | " |
| 3 | W-2 | F-3 | 0.09 | 0.45 | 0.30 | 2.26 | 1.01 | 0.06 | 0.008 | 0.16 | 0.03 | 0.002 | 1.41 | " |
| 4 | W-2 | F-4 | 0.06 | 0.55 | 0.23 | 2.31 | 1.00 | 0.02 | 0.009 | 0.22 | 0.03 | — | 1.17 | " |
| 5 | W-3 | F-3 | 0.05 | 0.43 | 0.36 | 3.05 | 1.01 | 0.02 | 0.008 | 0.14 | 0.03 | — | 0.95 | Compr. Ex. |
| 6 | W-2 | F-5 | 0.15 | 0.55 | 0.25 | 2.44 | 1.01 | 0.10 | 0.010 | 0.15 | 0.03 | — | 2.15 | " |
| 7 | W-3 | F-6 | 0.09 | 1.23 | 0.28 | 3.31 | 0.99 | 0.05 | 0.009 | 0.22 | 0.01 | — | 2.18 | " |
| 8 | W-2 | F-7 | 0.10 | 0.62 | 0.50 | 2.25 | 0.96 | 0.15 | 0.014 | 0.30 | 0.02 | — | 1.77 | " |
| 9 | W-1 | F-8 | 0.08 | 0.75 | 0.34 | 1.60 | 0.88 | 0.03 | 0.007 | 0.26 | 0.04 | — | 1.58 | " |
| 10 | W-3 | F-9 | 0.10 | 0.88 | 0.31 | 3.33 | 1.76 | 0.03 | 0.008 | 0.22 | 0.02 | — | 1.91 | " |
| 11 | W-2 | F-10 | 0.09 | 0.77 | 0.35 | 2.21 | 0.98 | 0.25 | 0.015 | 0.08 | 0.05 | — | 1.92 | " |
| 12 | W-2 | F-11 | 0.11 | 0.45 | 0.37 | 2.45 | 1.03 | 0.04 | 0.027 | 0.31 | 0.03 | — | 1.59 | " |
| 13 | W-4 | F-12 | 0.06 | 0.82 | 0.22 | 2.87 | 0.92 | 0.11 | 0.006 | 0.55 | 0.01 | — | 1.53 | " |
| 14 | W-4 | F-13 | 0.12 | 0.42 | 0.23 | 2.96 | 1.00 | 0.02 | 0.012 | 0.10 | 0.10 | — | 1.64 | " |
| 15 | W-2 | F-14 | 0.08 | 0.63 | 0.25 | 2.33 | 1.08 | 0.05 | 0.011 | 0.23 | 0.02 | 0.010 | 1.48 | " |
| 16 | W-4 | F-15 | 0.11 | 0.88 | 0.35 | 2.76 | 1.02 | 0.05 | 0.010 | 0.09 | 0.02 | — | 2.03 | " |

TABLE 5

| Ex. No. | Wire No. | Flux No. | Category | Energy Absorption at −40° C. (kgf · m) | 482° C. × $10^5$ hrs Creep Strength (kgf/mm$^2$) | Room Temperature Strength (kgf/mm$^2$) | Rating |
|---|---|---|---|---|---|---|---|
| 1 | W-1 | F-1 | Invention | 10.4 | 25.1 | 68.4 | O |
| 2 | W-1 | F-2 | " | 11.1 | 20.7 | 66.7 | O |
| 3 | W-2 | F-3 | " | 15.5 | 24.7 | 65.2 | O |
| 4 | W-2 | F-4 | " | 13.4 | 27.7 | 57.7 | O |
| 5 | W-3 | F-3 | Compr. Ex. | 1.1 | 22.5 | 50.3 | X |
| 6 | W-2 | F-5 | " | 3.3 | 14.5 | 72.1 | X |
| 7 | W-3 | F-6 | " | 10.3 | 12.6 | 70.4 | X |
| 8 | W-2 | F-7 | " | 4.1 | 9.3 | 67.1 | X |
| 9 | W-1 | F-8 | " | 12.3 | 20.5 | 69.6 | X |
| 10 | W-3 | F-9 | " | 1.1 | 12.1 | 73.8 | X |
| 11 | W-2 | F-10 | " | 13.7 | 11.7 | 64.1 | X |
| 12 | W-2 | F-11 | " | 2.3 | 20.7 | 68.8 | X |
| 13 | W-4 | F-12 | " | 0.9 | 22.4 | 70.0 | X |

TABLE 5-continued

| | | | | Results of Mechanical Tests on Deposit Metal | | | |
|---|---|---|---|---|---|---|---|
| Ex. No. | Wire No. | Flux No. | Category | Energy Absorption at $-40°$ C. (kgf · m) | $482°$ C. $\times 10^5$ hrs Creep Strength (kgf/mm$^2$) | Room Temperature Strength (kgf/mm$^2$) | Rating |
| 14 | W-4 | F-13 | " | 1.3 | 20.5 | 71.2 | X |
| 15 | W-2 | F-14 | " | 2.1 | 22.1 | 69.4 | X |
| 16 | W-4 | F-15 | " | 11.3 | 13.8 | 65.8 | X |

Note: Mechanical tests were conducted after a heat treatment ($690°$ C. $\times$ 28 hrs)

What is claimed is:

1. A covered electrode for use in arc welding of Cr-Mo low alloy steel, said covered electrode being controlled to contain, through adjustment of the contents of additive elements in the core wire and/or the flux thereof, $C \leq 0.12\%$, $Mn \leq 1.0\%$, $Si \leq 0.4\%$, $Cr = 1.9-3.5\%$, $Mo = 0.85-1.5\%$, $Ni \leq 0.2\%$, $N \leq 0.017\%$, $V = 0.16-0.4\%$ and $Nb = 0.002-0.045\%$ in a range according to Equation (1) below, and to have the value of P of Equation (2) below in the range of 1.00-1.70;

$$M = \{Bw \times [M(\%)]w\} + \{Af/1 - Af \times Bf \times [M(\%)]f\} \quad (1)$$

wherein

M: Content (%) of said additive element,

Bw: Coefficient of yield in the deposit metal of said element supplied from said core wire, Bf: Coefficient of yield in the deposit metal of said element supplied from said flux,

[M(%)]w: Content (%) of the core wire constituent element in the total mass of said core wire,

[M(%)]f: Content (%) of the flux constituent element in the total mass of said flux, and Af: Weight ratio (%) of the coated flux in the total mass of said electrode.

$$P = 10 \times C + Mn + Ni \, (\%). \quad (2)$$

2. A covered electrode as defined in claim 1, further containing 0.0005-0.0060% of B as an additive element.

3. A welded article comprising 2.25-3% Cr-1% Mo steel connected by a weld deposited by the electrode of claim 1.

4. A welded article comprising 2.25-3% Cr-1% Mo steel connected by a weld deposited by the electrode of claim 2.

* * * * *